United States Patent [19]

Ho

[11] 4,285,061

[45] Aug. 18, 1981

[54] EQUALIZER SAMPLE LOADING IN VOICEBAND DATA SETS

[75] Inventor: Edmond Y. Ho, Colts Neck Township, Monmouth County, N.J.

[73] Assignee: Bell Telephone Laboratories, Incorporated, Murray Hill, N.J.

[21] Appl. No.: 75,647

[22] Filed: Sep. 14, 1979

[51] Int. Cl.³ .............................................. H04B 3/14
[52] U.S. Cl. ....................................... 375/15; 333/18; 364/724; 375/39
[58] Field of Search ...................... 333/18; 375/12, 13, 375/14, 15, 18, 39; 364/724; 179/2 DD

[56] References Cited

U.S. PATENT DOCUMENTS

| | | | |
|---|---|---|---|
| 3,715,665 | 2/1973 | Chang | 375/13 |
| 3,715,666 | 2/1973 | Mueller et al. | 375/13 |
| 3,810,021 | 5/1974 | Kalet et al. | 375/61 |
| 3,878,468 | 4/1975 | Falconer et al. | 375/15 |
| 3,935,535 | 1/1976 | Motley et al. | 375/13 |
| 3,962,637 | 6/1976 | Motley et al. | 375/14 |
| 4,025,719 | 5/1977 | Nussbaumer | 375/15 |
| 4,061,978 | 12/1977 | Motley et al. | 375/14 |

Primary Examiner—Benedict V. Safourek
Attorney, Agent, or Firm—Ronald D. Slusky

[57] ABSTRACT

In a multipoint data communication system using quadrature-amplitude modulation, a master modem (20) and a plurality of tributary modems (11a, 11b ... 11n) are interconnected via respective transmission channels (13a, 13b ... 13n, 16). Adaptive equalizer circuitry (55, 56) in the master modem equalizes the channel from a particular tributary by multiplying samples of signals received from the tributary by an ensemble of tap coefficients associated with the tributary. The tap coefficient ensembles for each tributary are stored in a memory (91) from which they are retrieved at the start of transmission from that tributary. Timing-acquisition circuitry (29) within the master modem adjusts the phase of the letter's sampling circuitry (23, 27) at the start of transmission from a given tributary so that the received signals are sampled at the correct time points. In particular, a timing acquisition signal having spectral components only within the non-rolloff region of the equalized baseband-equivalent transfer function is transmitted by the tributary. The master samples and equalizes the received timing acquisition signal to form a succession of timing acquisition equalizer outputs. The time by which the operation of the sampling circuitry is to be advanced or retarded is determined as a trigonometric function of two successive ones of the timing acquisition equalizer outputs. The timing acquisition signal is illustratively a double-dotting pattern having a four-symbol-interval period. That period is integrally related to the carrier frequency. This allows the samples needed in order to begin forming the timing acquisition equalizer outputs to be generated by replicating the samples taken over only four symbol intervals.

16 Claims, 8 Drawing Figures

| → SAMPLES TAKEN AT $t = \frac{nT}{2}$

¦ → SAMPLES TAKEN AT $t = \frac{nT}{2} + \tau$

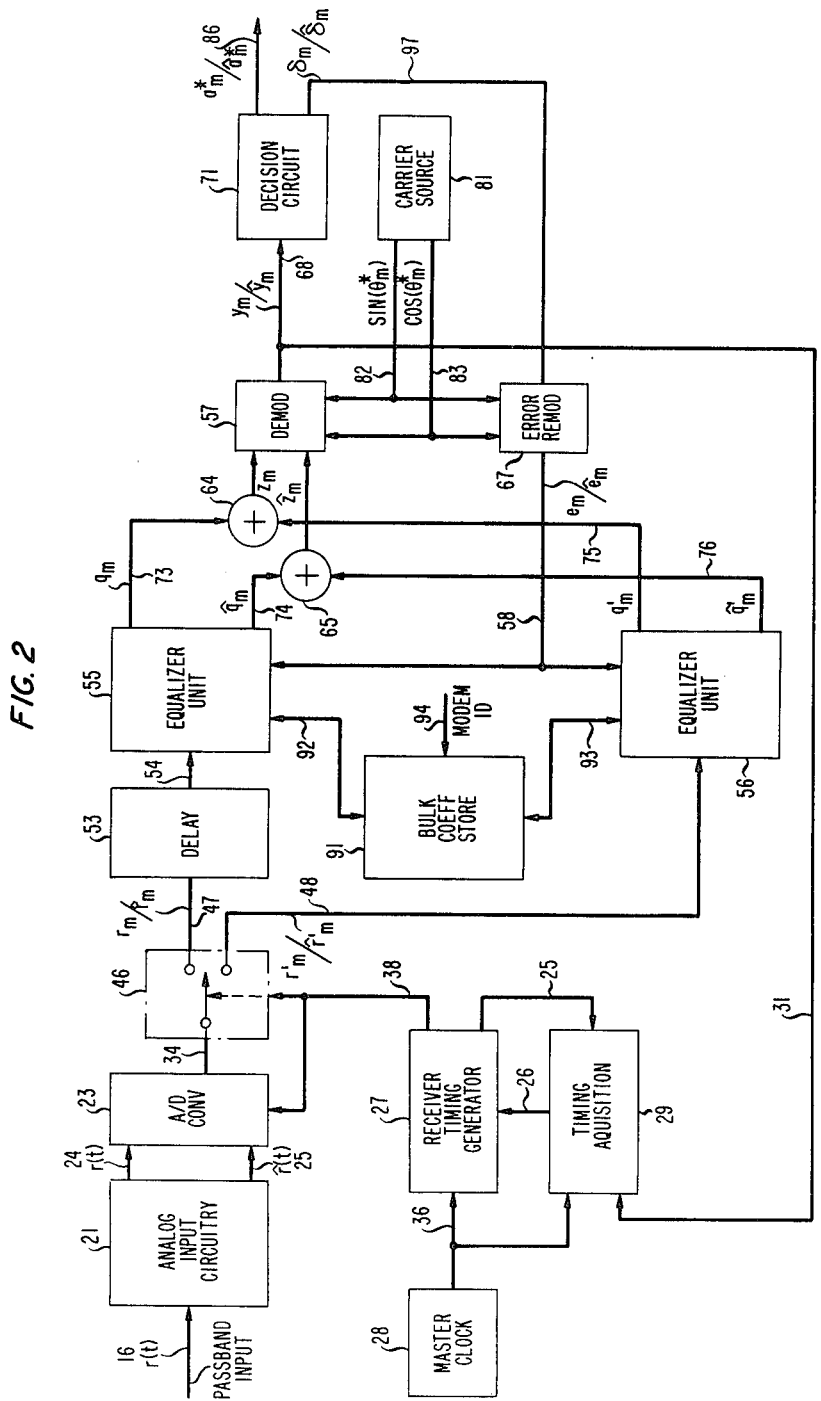

EQUALIZER SAMPLE LOADING IN VOICEBAND DATA SETS

BACKGROUND OF THE INVENTION

The present invention relates to automatic equalizers which compensate for the distorting effects of bandlimited channels on transmitted data signals.

Automatic equalizers are necessary for accurate reception of high speed data signals transmitted over bandlimited channels with unknown transmission characteristics. The equalizer, which is resident in the receiver portion of a data set, or "modem", is generally in the form of a transversal filter. Samples of the incoming data signal, referred to herein as "line samples", are formed at a predetermined sampling rate. The line samples, which represent the value of the received signal at the time points at which they are taken, are applied to the filter, where they are multiplied by respective tap coefficients. The resulting products are added together and, if necessary, demodulated to generate what is hereinafter referred to as a "baseband equalizer output," or just "equalizer output." The equalizer output is thereafter quantized to recover the transmitted data. In addition, an error signal is formed equal to the difference between the equalizer output and a reference signal which represents the transmitted data symbol. In the so-called adaptive type of automatic equalizer, in particular, the reference signal is derived from the decision made in the receiver (on the basis of the equalized signal value) as to what data symbol was transmitted. The error signal is used to update the tap coefficient values in such a way as to minimize a measure of the distortion—assumed to be primarily intersymbol interference—introduced by the channel.

Before accurate data recovery can be assured, appropriate values for a number of equalizer operating parameters need to be established. These may include, for example, an initial set of tap coefficient values, the timing epoch and the demodulating carrier phase. These parameters are functions of, for example, the transmitter clock phase and the transfer function of the channel, neither of which is known at the receiver. Accordingly, a start-up signal sequence from which the appropriate parameter values can be determined at the receiver is transmitted thereto over the channel in question. Line samples of various signals within the start-up sequence are loaded into the equalizer and processed in the manner described above. The required parameter values are then arrived at in response to the resulting error signals and/or equalizer outputs.

It is desirable in most applications, and crucial in some, to minimize the length of the start-up period; the time consumed in the start-up process is time wasted from the standpoint of the transmission of message data. One of the factors contributing to the length of the start-up period is the time required to "load the equalizer," by which is meant the generation of a sufficient number of line samples that the above-described decision- and error-forming process—and thus determination of the equalizer operating parameters—can begin.

SUMMARY OF THE INVENTION

The present invention is directed to a technique which enables the equalizer to be rapidly loaded with line samples, provided only that the signal being sampled is a periodic signal of known period NT.

In accordance with the invention, the line sample value at Np initial time points is determined by sampling the signal at a predetermined sampling rate of p/T samples per second. The line sample value at each one of a sufficient number of "remaining" time points to load the equalizer is then determined as a function of the line sample value at a respective associated one of the "initial" time points. In an illustrative embodiment of the invention, more particularly, the line sample value at each initial time point is used to determine the line sample values NTd seconds later, $d = 1, 2, \ldots$.

The line sample values may be either real or complex. Thus, for example, the invention is illustrated herein in the context of a quadrature amplitude modulated (QAM) system in which the periodic signal is modulated onto each of two carriers of radian frequency $\omega_c$. At the receiver, the received signal is passed through a phase splitter to form a complex signal comprised of Hilbert transform pair $r(t)$ and $\hat{r}(t)$. The above-mentioned function is then given by $$r(t_0+NTd) = r(t_0)\cos(\omega_c NTd) - \hat{r}(t_0)\sin(\omega_c NTd)$$

$$\hat{r}(t_0+NTd) = \hat{r}(t_0)\cos(\omega_c NTd) + r(t_0)\sin(\omega_c NTd),$$

$d = 1, 2 \ldots$ where $t_0$ is any selected one of the Np "initial" time points and $(t_0+NTd)$ are the ones of the "remaining" time points with which initial time point $t_0$ is associated.

In preferred embodiments of the invention, $\omega_c$, N and T are selected such that $\omega_c NT = 2\pi n$, where n is any integer. In this case, $\cos(\omega_c NT) = 1$ and $\sin(\omega_c NT) = 0$, so that $$r(t_0+NTd) = r(t_0)$$

$$\hat{r}(t_0+NTd) = \hat{r}(t_0)$$

$d = 1, 2, \ldots$.

That is, the value of each Hilbert transform component at each "initial" time point is simply replicated in order to arrive at the value of the corresponding component at respective ones of the "remaining" time points.

The present invention is particularly useful in conjunction with the timing acquisition technique taught in the U.S. patent application of R. D. Gitlin et al, Ser. No. 75,646, filed of even date herewith and assigned to the same assignee.

BRIEF DESCRIPTION OF THE DRAWING

FIG. 2 is a block diagram of the receiver portion of the master modem of FIG. 1, the receiver including timing acquisition circuitry which utilizes the line sample generation technique of the present invention;

DETAILED DESCRIPTION

Figure 1:
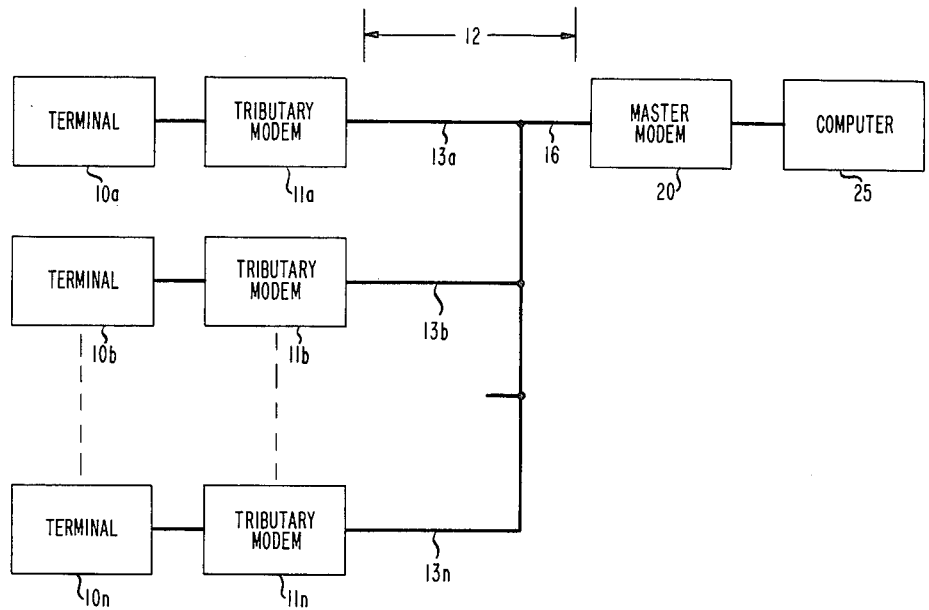
FIG. 1 depicts a Communication system comprised of a master modem and plurality of tributary modems.

A communication system in which the present invention is particularly useful is shown in FIG. 1. In this system, a computer 25 communicates on a time-shared basis with a plurality of data terminals 10a, 10b ... 10n via a multipoint network 12. In particular, computer 25 is connected to a particular one of terminals 10a, 10b ... 10n via a channel which includes common path 16 and a respective one of the branch paths 13a, 13b ... 13n. Paths 13a, 13b ... 13n and 16 are illustratively private-line voiceband telephone circuits. Terminals 10a, 10b ... 10n are connected to network 12 via tributary modems 11a, 11b ... 11n. Computer 25 is connected to network 12 via master modem 20. Modems 11a, 11b ... 11n and 20 provide several functions. One is to correct for distortion—notably intersymbol interference—and other channel irregularities. The other is to modulate the data which is to be transmitted into, and demodulate it out of, the passband of the channel.

With respect to the latter function, more particularly, the system of FIG. 1 illustratively uses a quadrature-amplitude modulation (QAM) scheme. (The invention is, however, applicable to transmission systems using other modulation schemes as well as to baseband systems.) In the present QAM arrangement, four paralleled information bits are communicated during each symbol interval of duration $T=1/2400$ sec. The symbol rate is thus 2400 baud, yielding a binary data transmission rate of 9600 bits per second. During each symbol interval, the four bits to be transmitted are encoded into two signal levels, each of which can take on one of the four values $[+1, -1, +3, -3]$. The two signal levels transmitted during the $m^{th}$ symbol interval comprise data symbol $A_m$—a complex quantity having real and imaginary components $a_m$ and $\hat{a}_m$, respectively. Components $a_m$ and $\hat{a}_m$, in turn, amplitude modulate respective 1800 Hz in-phase and quadrature-phase carrier waves. The two modulated signals, when added together, form a QAM signal which is then transmitted.

Attention is now directed to FIG. 2, which shows a block diagram of the receiver portion of modem 20. The QAM passband signal transmitted by a particular tributary modem is received by modem 20 on lead 16. The received signal $r(t)$ passes to analog input circuitry 21 comprised of a bandpass filter and Hilbert transform circuit. The output of circuit 21 is comprised of a Hilbert transform pair $r(t)$ and $\hat{r}(t)$ derived from the received passband signal. These are passed to an A/D converter 23.

A master clock 28 generates 128 master clock pulses every T seconds on lead 36. These are received by receiver timing generator 27. The latter counts the pulses on lead 36 and generates timing signal on a number of output leads to control the sequencing of the various signal processing functions within the master modem. One of these leads shown explicitly in FIG. 2 is lead 38. The latter extends pulses to A/D converter 23 once every T/P seconds. The latter responds by generating line samples at p/T samples per second. The parameter p is illustratively equal to 2. Converter 23 is thus operated at $2/T=4800$ times per second, i.e., twice the symbol rate, to generate two passband, i.e., modulated, line samples $R_m$ and $R'_m$ during the $m^{th}$ receiver symbol interval. (An alternative way of generating $R_m$ and $R'_m$ is to first sample and digitize the received signal at a rate greater than twice its highest frequency component and then pass the resulting signal through a digital phase-splitter.)

QAM signals are conveniently expressed and processed as complex numbers, each having a real and imaginary component. The real and imaginary components of the line samples formed by A/D converter 23 are provided one after the other in serial form as separate ten-bit digital signals, or words, on output lead 34. (Each of the other signal leads in FIG. 2 similarly carries its signals in serial form.) Notationally, the real and imaginary components of sample $R_m$ are represented as $r_m$ and $\hat{r}_m$.

Those of sample $R'_m$ are represented as $r'_m$ and $\hat{r}'_m$.

Line samples $R_m$ and $R'_m$, which are spaced T/2 seconds apart, are equalized using two synchronous equalizer units 55 and 56. Each of these units is adapted to filter a complex sample stream in which the samples are spaced T seconds apart. Switch 46, also responsive to the pulses on lead 38, applies components $r_m$ and $\hat{r}_m$ to equalizer unit 55 and components $r'_m$ and $\hat{r}'_m$ to equalizer unit 56. Separate data streams, each containing samples spaced T seconds apart, are thus presented to each equalizer unit. A delay unit 53 is interposed between switch 46 and equalizer unit 55 so that $r_m$ and $\hat{r}_m$ are applied to equalizer unit 55 at the same time that $r'_m$ and $\hat{r}'_m$ are applied to equalizer unit 56. This advantageously allows equalizer units 55 and 56 to be controlled via the same clocking and timing leads (not shown) from timing generator 27.

The output signals of equalizer units 55 and 56 during the $m^{th}$ receiver symbol interval are complex signals $Q_m$ and $Q'_m$ given by $$Q_m = \sum_{i=1}^{2M} C_i(m) R_{m-i}$$

and $$Q_m' = \sum_{i=1}^{2M} C_i'(m) R'_{m-i}$$

In these expressions the $C_i(m)$'s and $C'_i(m)$'s, $i=(1,..,2M)$, represent respective ensembles complex "tap" coefficients, stored in equalizer units 55 and 56, respectively. M is an integer illustratively equal to 16. Each coefficient has a particular value associated with the $m^{th}$ receiver interval. The real and imaginary components of $Q_m$ are $q_m$ and $\hat{q}_m$; those of $Q'_m$ are $q'_m$ and $\hat{q}'_m$. The real and imaginary components of each $C_i(m)$ are $c_i(m)$ and $\hat{c}_i(m)$; those of each $C'_i(m)$ are $c'_i(m)$ and $\hat{c}'_i(m)$. The above expressions for $Q_m$ and $Q_m$ are thus expressed in terms of their real and imaginary components as $$q_m = \sum_{i=1}^{2M} c_i(m) r_{m-i} - \sum_{i=1}^{2M} \hat{c}_i(m) \hat{r}_{m-i}$$

$$\hat{q}_m = \sum_{i=1}^{2M} c_i(m) \hat{r}_{m-i} + \sum_{i=1}^{2M} \hat{c}_i(m) r_{m-i},$$

$$q_m' = \sum_{i=1}^{2M} c_i'(m) r'_{m-i} - \sum_{i=1}^{2M} \hat{c}_i'(m) \hat{r}'_{m-i}, \text{ and}$$

$$\hat{q}_m' = \sum_{i=1}^{2M} c_i'(m) \hat{r}'_{m-i} + \sum_{i=1}^{2M} \hat{c}_i'(m) r'_{m-i}.$$

Components $q_m$, $\hat{q}_m$, $q'_m$ and $\hat{q}'_m$ appear as individual ten-bit words on leads 73, 74, 75 and 76, respectively. Components $q_m$ and $q'_m$ are added together in an adder 64 while components $\hat{q}_m$ and $\hat{q}'_m$ are added together in an adder 65. The outputs of adders 64 and 65 are the real and imaginary components $z_m$ and $\hat{z}_m$ of a passband equalizer output $Z_m$ representing the modulated version of transmitted symbol $A_m$. (Passband equalizer output $Z_m$ could have been equivalently generated using a single equalizer unit having taps spaced at T/2 second intervals.)

Passband equalizer output $Z_m$ is demodulated to baseband by demodulator 57. The demodulated output of demodulator 57 is baseband equalizer output $Y_m$, representing the baseband version of symbol $A_m$. Baseband equalizer output $Y_m$ is hereinafter more concisely referred to as equalizer output $Y_m$. The latter has real and imaginary components $y_m$ and $\hat{y}_m$, provided seriatim as tenbit words on lead 68. The demodulation process performed by demodulator 57 is expressed in complex notation as $$y_m = Z_m e^{-j\theta^*_m}$$

where $\theta^*_m$ is an estimate of the current carrier phase. In terms of real and imaginary components, the demodulation process is expressed as $$y_m = z_m \cos(\theta^*_m) + \hat{z}_m \sin(\theta^*_m)$$

$$\hat{y}_m = \hat{z}_m \cos(\theta^*_m) - z_m \sin(\theta^*_m).$$

For purposes of generating $y_m$ and $\hat{y}_m$ in accordance with the above expressions, demodulator 57 receives nine-bit digital representations of $\sin(\theta^*_m)$ and $\cos(\theta^*_m)$ on output leads 82 and 83 of carrier source 81.

Components $y_m$ and $\hat{y}_m$ are quantized in decision circuit 71. The resulting outputs, provided one after the other on lead 86, are decisions $a^*_m$ and $\hat{a}^*_m$ as to the signal levels represented by components $a_m$ and $\hat{a}_m$ of symbol $A_m$. Decisions $a^*_m$ and $\hat{a}^*_m$ can be thought of as the real and imaginary components of a complex decision $A^*_m$.

Decision circuit 71 also provides, on lead 97, the real and imaginary components, $\delta_m$ and $\hat{\delta}_m$, of a complex baseband error signal $\Delta m$ associated with the data symbol in question. Error signal $\Delta_m$ is equal to the quantity $(Y_m - A^*_m)$. In particular, $\delta_m = (y_m - a^*_m)$ and $\hat{\delta}_m = (\hat{y}_m - \hat{a}^*_m)$, with $\delta_m$ and $\hat{\delta}_m$ being expressed as respective twelve-bit words. Error signal $\Delta_m$ is remodulated in error remodulator 67 to yield a remodulated, or passband, error signal $E_m$ given by $$E_m = \Delta_m e^{+j\theta^*_m}.$$

The real and imaginary components of $E_m$, $e_m$ and $\hat{e}_m$, are generated by remodulator 67 in accordance with $$e_m = \delta_m \cos(\theta^*_m) - \hat{\delta}_m \sin(\theta^*_m)$$

$$\hat{e}_m = \delta_m \sin(\delta^*_m) + \hat{\delta}_m \cos(\theta^*_m).$$

In order to form these quantities, remodulator 67, like demodulator 57, receives $\sin(\theta^*_m)$ and $\cos(\theta^*_m)$ from carrier source 81.

Components $e_m$ and $\hat{e}_m$ are extended seriatim to equalizer units 55 and 56 on lead 58 for purposes of coefficient updating, as described below. (An alternative way of generating error signal $E_m$ would be to remodulate complex decision $A^*_m$ and subtract it from passband equalizer output $Z_m$. In either case, the value of $E_m$ is the same, it being equal to the difference, modulated at the carrier frequency, between the pre- and post-quantized values of equalizer output $Y_m$).

At this point, the values of the $C_i(m)$ and $C'_i(m)$ tap coefficient values are updated within equalizer units 55 and 56, respectively, in preparation for the next, $(m+1)^{st}$, symbol interval. The updating rules illustratively used are $$C_i(m+1) = C_i(m) - \alpha E_m R_{m-i} - \alpha\mu SGN[C_i(m)]$$

and $$C'_i(m+1) = C'_i(m) - \alpha E_m R_{m-i} - \alpha\mu SGN[C'_i(m)],$$

where $\alpha$ and $\mu$ are selected constants and the value of the complex function SGN[] is $\pm 1 \pm j$ depending on the signs of the real and imaginary components of its complex argument. These updating rules implement the so-called mean-squared updating algorithm, modified in accordance with the tap leakage technique taught in commonly-assigned, copending U.S. patent application, Ser. No. 16,495 filed Mar. 1, 1979.

The above updating rules are expressed in terms of their real and imaginary components as $$c_i(m+1) = c_i(m) - \alpha e_m r_{m-i} + \alpha \hat{e}_m \hat{r}_{m-i} - \alpha\mu sgn[c_i(m)],$$

$$\hat{c}_i(m+1) = \hat{c}_i(m) - \alpha e_m \hat{r}_{m-1} - \alpha \hat{e}_m r_{m-1} - \alpha\mu sgn[\hat{c}_i(m)],$$

$$c'_i(m+1) = c'_i(m) - \alpha e_m r'_m - i + \alpha \hat{e}_m \hat{r}'_{m-i} - \alpha\mu sgn[c'_i(m)]$$

and $$\hat{c}'_i(m+1) = \hat{c}'_i(m) - \alpha e_m \hat{r}'_{m-i} - \alpha \hat{e}_m r'_{m-i} - \alpha\mu sgn[\hat{c}'_i(m)],$$

where the value of the real function sgn[] is $+1$ or $-1$, depending on the sign of its argument.

Although the above description has focused on the operation of master modem 20 in recovering data transmitted from a tributary modem, it will be appreciated that similar signal processing is needed in each tributary in order to accurately recover data transmitted to it from the master. Once an appropriate set of coefficients for use in a particular tributary is determined, those same coefficients are used for subsequent transmissions received by that tributary since it receives all its transmissions over but a single channel; a tributary modem communicates only with the master modem, not with other tributaries. Indeed, each tributary modem is able to continually fine-tune its coefficient values. This is because all transmissions emanating from the master modem are received (although not responded to) by each tributary modem over its channel from the master modem.

Master modem 20 by contrast, receives communications over many different channels. Before it can recover data from a particular tributary, its tap coefficients must be set to values which compensate for the characteristics of the channel involved. An appropriate set of coefficient values could be determined from "scratch" at the start of each transmission. This is a time-consuming process, however, and, as described above, limits the amount of useful data that can be transmitted per unit time from a tributary modem to the master modem.

In order to ameliorate this problem, as shown in FIG. 2, modem 20 is provided with a bulk coefficient store 91. Once communications with a particular tributary modem are completed, the then-existing coefficient values in equalizer units 55 and 56 are read into store 91 via leads 92 and 93, respectively. The next time a message is to be received from that same tributary modem, the address of that modem is provided to store 91 via lead 94. This causes the previously-determined coefficients to be read out of store 91 and "jam set" into equalizer units 55 and 56 via, again, leads 92 and 93.

There is another factor to be taken into account, however, that being the so-called timing epoch. This may be understood by reference to FIG. 3. Waveforms 101 and 102 in that FIG. are typical analog outputs of circuit 21 on leads 24 and 25, respectively. As previously discussed, the real (imaginary) line sample components $r_m$ and $r'_m$ ($\hat{r}_m$ and $\hat{r}'_m$) are formed alternately by sampling waveform 101 (102) every T/2 seconds. The point to be appreciated is that the particular tap coefficient values that result from the above-described coefficient updating process are a function of not only the channel, but where along waveforms 101 and 102 the samples are formed.

Figure 3:
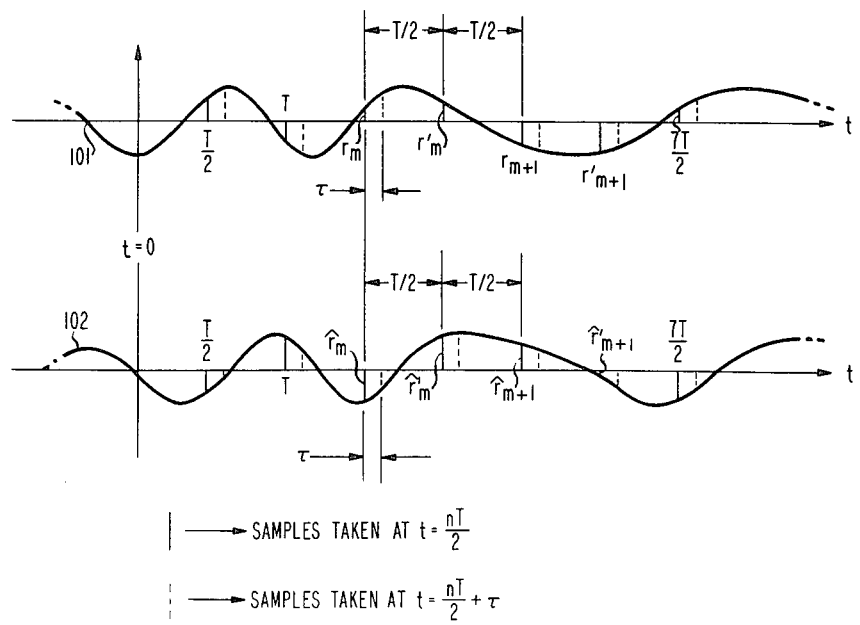
FIG. 3 shows signal waveforms helpful in explaining the operation of the receiver of FIG. 2.

For example, the line sample components $r_m$, $r'_m$, etc. and $\hat{r}_m$, $\hat{r}'_m$, etc. are shown by the solid sample lines in FIG. 3 as being formed with one timing epoch defined by $t=(nT)/2$, $n=0, 1, 2 \ldots$. Sampling at these time points results in one ensemble of coefficient values. If, however, waveforms 101 and 102 were to be sampled $\tau$ seconds later at $t=(nT)/2+\tau$, as indicated by the dashed sample lines, the coefficient updating process would arrive at a different ensemble of coefficient values. Thus, reading a previously-determined ensemble of coefficient values out of store 91 for use in recovering currently transmitted data is useful only if the received signal is sampled with the timing epoch associated with those coefficient values. Stated another way, the filter characteristic specified by a particular ensemble of jam-set coefficient values cause equalizer output $Y_m$ to be optimally free of intersymbol interference only when waveforms 101 and 102 are sampled at a particular, optimum, set of sampling points.

The task of providing the proper timing epoch for a previously-determined set of coefficients could, in theory, be performed by transmitting a short burst of an appropriate timing acquisition tone from the tributary to the master and adjusting the receiver timing generator such that samples are formed at some predetermined point on the received tone. In theory, again, once an ensemble of tap coefficients is arrived at using this timing epoch, all one would need to do in order to use the same coefficients for subsequent transmissions from the same tributary would be to re-transmit the timing acquisition tone and reacquire the same timing epoch.

The problem with such an approach is that there is a tendency for the relative phase between the transmitter and receiver clocks to drift due to such factors as deviation between the transmitter and receiver clock frequencies and variations over time in the delay characteristics of the channel. Such drift, if uncorrected, would cause the received waveform to be sampled at the wrong time points for the tap coefficients then being used. This phenomenon necessitates the use of some form of continually operating timing recovery circuitry, the function of which is to advance or retard the receiver timing circuitry so as to ensure that the received signal is, in fact, sampled with the correct timing epoch. If an ideal timing acquisition technique were available, the above-described approach could, at least in theory, be workable in a system which uses coefficient jam-setting. As a practical matter, however, the timing recovery techniques of which we are aware are themselves subject to a certain amount of jitter, at least when operating on random data. That is, they are capable of maintaining the timing epoch only within some range about the nominally correct value. This is not a problem so far as accurate data recovery is concerned; as long as the rate of timing drift is within design limits, the tap coefficient updating algorithm will change the coefficient values to compensate for same. By the same token, when a previously-determined ensemble of coefficient values is jam set into the equalizer at the start of a transmission, those coefficients will, in general, have different values than they had at any particular time at which the timing epoch was known during any previous transmission. They thus require a different, unknown, timing epoch.

Figure 4:
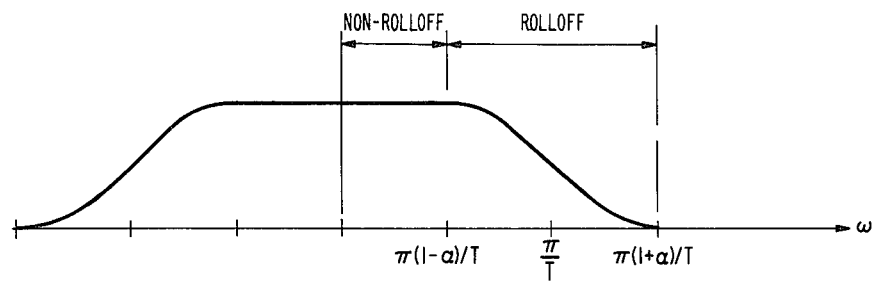
FIG. 4 shows a typical equalized baseband-equivalent transfer function.

The above-cited U.S. patent application of R. D. Gitlin et al discloses a technique for determining that timing epoch. In accordance with that technique, the timing epoch is determined by transmitting a periodic data pattern of period NT, resulting in a frequency spectrum comprised of at least a first plurality of spectral lines spaced $2\pi/NT$ radians/second apart. The data pattern is such that after transmitter filtering, the signal has frequency components only within the non-rolloff region of the equalized baseband-equivalent transfer function $G(\omega)$. A typical such transfer function is shown in FIG. 4. The non-rolloff region, more particularly, is characterized by constant gain and satisfies the criteria $G(\omega-2\pi/T)=0$ and $G(\omega)=G(-\omega)$. The received signal is sampled with an arbitrary timing epoch, resulting in a timing error $\tau$, and equalized with a previously-determined set of tap coefficients. The resulting equalizer outputs represent successive instantaneous samples of some periodic signal at a particular set of time points defined by $t=m\bar{T}+\tau'$, $m=0, 1, 2 \ldots$. Here, $\tau'$ is the difference between the actual locations of those samples, and what their locations would be if the timing epoch were correct. A consequence of the above discussion is that that difference, $\tau'$, is in fact equal to the timing error, $\tau$. The parameter $\tau'$ can be determined from the equalizer outputs. Thus, $\tau$ can be determined and the receiver timing phase adjusted to eliminate the timing error.

In the present illustrative embodiment, more particularly, as in the Gitlin et al disclosure, the timing acquisition signal is generated by modulating a so-called double dotting pattern, $+1,+1,-1,-1,+1,+1$ etc., onto both the in-phase and quadrature-phase carriers when timing acquisition is to be performed. Since $1/T=2400$, the period of the double dotting pattern is 1/600 sec. After baseband filtering, this results in a sinusoid at 600 Hz. The percent of rolloff, $\alpha$, is illustratively 0.12. Thus, the non-rolloff region extends from dc to $2112\pi$ rad/sec = 1056 Hz. As required, then, the 600 Hz. sinusoid is within the non-rolloff region.

Figure 5:
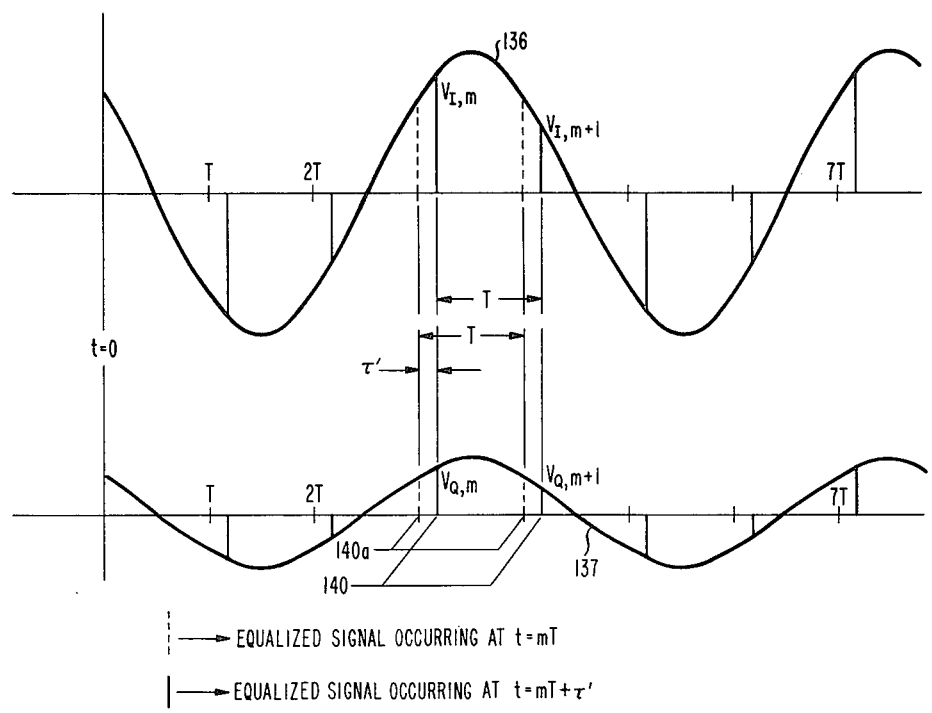
FIG. 5 shows further signal waveforms helpful in explaining the operation of the receiver of FIG. 2.

At the receiver, equalization and demodulation of the received signal using the previously-determined ensemble of tap coefficients for the channel in question results in the timing acquisition equalizer outputs shown in FIG. 5. The in-phase outputs are denominated $v_{I,m}$, $v_{I,m+1}$, etc. The quadrature-phase outputs are denominated $V_{Q,m}$, $V_{Q,m+1}$, etc. Both the $v_I$'s and $v_Q$'s are periodic samples of 600 Hz. sinusoids 136 and 137. (Sinusoids 136 and 137 are convenient mathematical constructs; no such analog waveforms actually appear within the receiver.)

Each of the $v_I$'s (or $v_Q$'s) represents a successive one of the data symbols $+1, +1, -1, -1$, etc. transmitted on the in-phase (quadrature-phase) carrier. Thus, if the timing epoch were correct, the $v_I$'s ($v_Q$'s) would all have the same amplitude and, as indicated by the dashed sample lines, would constitute samples of sinusoid 136 (137) at time points 140a. Time is defined such that the latter time points occur at $t = mT$, $(m = 0, 1, 2 \ldots)$. In actuality, the $v_I$'s ($v_Q$'s) are at time points 140 occurring at $t = mT + \tau'$. Once any two successive $v_I$'s ($v_Q$'s) are known, $\tau'$ can be determined trigonometrically therefrom (as outlined below). The determination of $\tau'$ may be inaccurate if the sample magnitudes of the $v_I$'s or $v_Q$'s are near zero. Thus, the choice of whether to determine $\tau'$ from the $v_I$'s or the $v_Q$'s is made on the basis of which is larger; sinusoids 136 and 137 have different amplitudes because in the illustrative embodiment, the $v_I$'s and $v_Q$'s are formed before the carrier phase estimate $\theta_m^*$ has been made in carrier source 81. Whichever set of equalizer outputs is the larger is notationally represented as $v_{L,m}$, $v_{L,m+1}$, etc.

Once any two successive $v_L$'s are known, the magnitude of $\tau'$ is readily determined trigonometrically as $$\tau' = \frac{2T}{\pi} [(\pi/4) - \tan^{-1}(\gamma/\beta)],$$

where $\beta$ = the larger of $|v_{L,m}|$ and $|V_{L,m+1}|$ and $\gamma$ = the smaller of $|v_{L,m}|$ and $|v_{L,m+1}|$.

Moreover, the sign of $\tau'$, $\text{sgn}[\tau']$, is given by $\text{sgn}[\tau'] = \text{sgn}[v_{L,m}] \text{sgn}[v_{L,m+1}] \text{sgn}[|v_{L,m+1}| - |v_{L,m}|]$.

Figure 6:
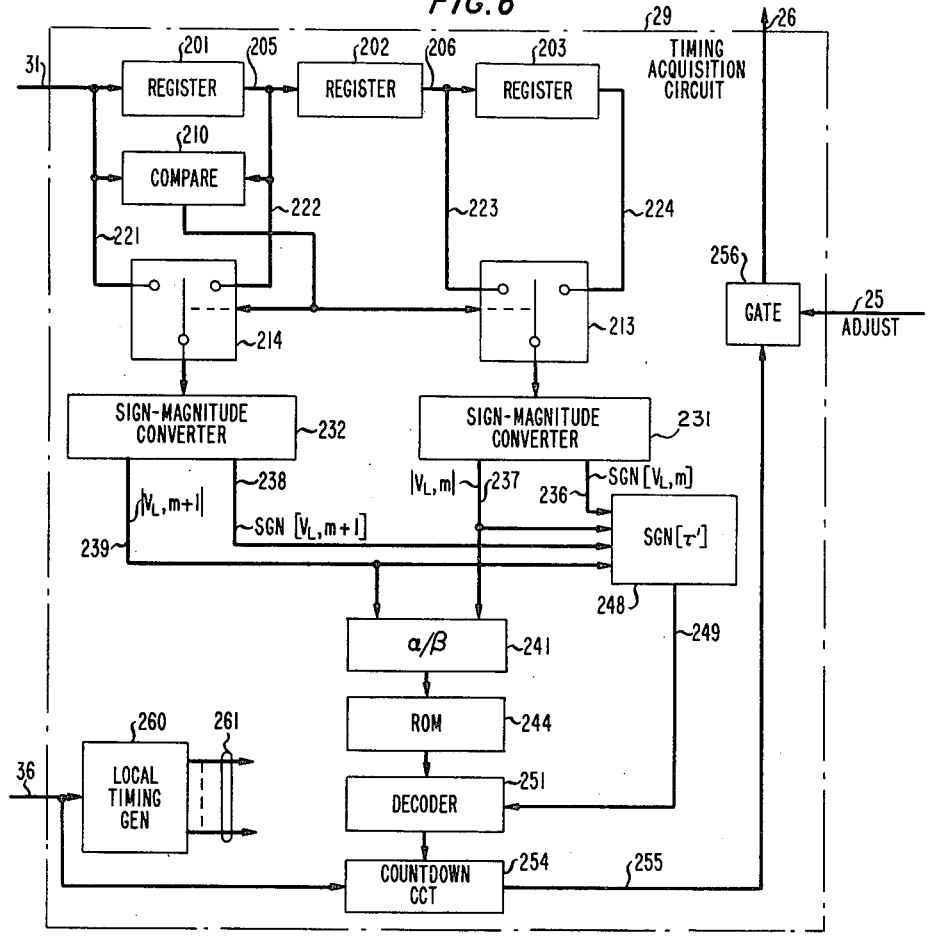
FIG. 6 is a block diagram of the timing acquisition circuitry used in the receiver of FIG. 2.

Attention is now directed to FIG. 6, which is a block diagram of timing acquisition circuit 29. The overall function of circuit 29 is to receive the timing acquisition equalizer outputs—the $v_I$'s and $v_Q$'s—generated at the output of demodulator 57 in response to the transmitted double-dotting pattern, and to determine $|\tau'|$ and $\text{sgn}[\tau']$ therefrom in accordance with the above expressions. If the sampling phase, i.e., the operation of receiver timing generator 27, is to be retarded by $|\tau'|$, circuit 29 generates an inhibit signal on its output lead 26 for a time interval equal to $|\tau'|$. Lead 26 extends to receiver timing generator 27. The latter is essentially a divider circuit which puts out on lead 38 a sampling pulse for each 64 master clock pulse that it counts (there being 128 master clock pulses in each T second interval). Timing generator 27 is inhibited from counting master clock pulses, however, for the duration of the inhibit signal on lead 26. The sampling phase is thus retarded by $|\tau'|$. If the sampling phase is to be advanced by $|\tau'|$, the inhibit signal on lead 26 is generated for a time interval equal to $T - |\tau'|$; retarding the sampling phase by $T - |\tau'|$ is equivalent to advancing it by $|\tau'|$.

Timing acquisition circuit 29 illustratively includes its own local timing generator 260 which receives the master clock pulses from lead 36 and generates its own timing signals on leads 261. The latter, rather than leads from receiver timing generator 27, illustratively control the timing of the operation of the components of circuit 29.

More particularly, the equalized timing acquisition signals $v_{I,m}$, $v_{Q,m}$, $v_{I,m+1}$, $v_{Q,m+1}$ are applied seriatim from lead 31 through serial in-serial out shift registers 201-203 via connecting leads 205 and 206. Each of the registers 201-203 is capable of holding one of these signals. Attention is directed to the point in time that $V_{I,m}$ has been fully shifted into register 201. The bits of $v_{I,m}$ now begin to appear on lead 205 as they pass into register 202 while the bits of $V_{Q,m}$ appear on lead 31. As corresponding bits of timing acquisition equalizer outputs $v_{I,m}$ and $v_{Q,m}$ appear on leads 205 and 31, respectively, comparator 210 compares them and determines which is the larger. After $v_{I,m}$ has been loaded into register 203—$v_{Q,m}$ and $v_{I,m+1}$ now being in registers 202 and 201, respectively—comparator 210 operates switches 213 and 214. If $v_{I,m}$ was determined to be larger (the situation depicted in FIG. 5), switches 213 and 214 are thrown to the right so that $v_{I,m}$ and $v_{I,m+1}$ will be used to determine $\tau'$. In particular, as the timing acquisition equalizer outputs continue shifting to the right, the bits of $v_{I,m}$ would pass via lead 224 and switch 213 to sign-magnitude converter 231 while the bits of $v_{I,m+1}$ would pass via lead 222 and switch 214 to sign-magnitude converter 232. If, on the other hand, $v_{Q,m}$ were to be larger than $v_{I,m}$, then $v_{Q,m}$ and $v_{Q,m+1}$ would be used to determine $\tau'$. In this event, comparator 210 would throw switches 213 and 214 to the left. Converters 231 and 232 would then receive $v_{Q,m}$ and $v_{Q,m+1}$, respectively. Whichever set of timing of acquisition equalizer outputs reaches converters 231 and 232 is, as previously described, notationally represented as $v_{L,m}$ and $v_{L,m+1}$.

Sign-magnitude converters 231 and 232 provide binary words representing the magnitudes $|v_{L,m}|$ and $|v_{L,m+1}|$, respectively, on leads 237 and 239. They also provide a single bit on each of leads 236 and 238 representing the signs of $v_{L,m}$ and $v_{L,m+1}$, respectively. The magnitudes on leads 237 and 239 pass to arithmetic circuit 241. The latter forms the quotient $\gamma/\beta$ by dividing the smaller of $|v_{L,m}|$ and $|v_{L,m+1}|$ by the larger. That quotient, represented as a five-bit word, passes to read-only memory (ROM) 244. For each value of $\gamma/\beta$ there is a corresponding $|\tau'|$. For each $|\tau'|$, in turn, there is a corresponding number of master clock pulses by which the operation of timing generator 27 is to be retarded or advanced. ROM 244 provides a look-up table function, converting the value of $\gamma/\beta$ directly into the corresponding number of master clock pulses.

At the same time, sign computation circuit 248, which receives the signals on each of leads 236-239, computes $\text{sgn}[\tau']$ in accordance with the above expression therefor. A bit indicating the value of $\text{sgn}[\tau']$ is extended to decoder 251 or lead 249. If $\text{sgn}[\tau'] = +1$, the sampling phase is to be retarded. In this case the output of ROM 244 is simply passed through decoder 251 to countdown circuit 254. If $\text{sgn}[\tau'] = -1$, the sampling phase is to be advanced. In this event, decoder 251 subtracts the count provided by ROM 244 from 128, which, again, is illustratively the number of master clock pulses which occur in T seconds. As previously described, advancing the timing epoch by $|\tau'|$ is equivalent to retarding it by $T - |\tau'|$.

At a predetermined point in each receiver symbol interval, circuit 254 initiates an inhibit signal on lead 255, which is passed through to lead 26 via gate 256. At the same time, circuit 254 responds to each master clock pulse by decrementing the count theretofore loaded into it from decoder 251. When that count reaches zero, the inhibit signal on lead 255 is terminated. The inhibit signal is thus of duration $|\tau'|$ or $T - |\tau'|$, as appropriate.

Circuit 29 operates continuously. That is, not only does it perform the above described signal processing on the timing acquisition equalizer outputs, but on all the equalizer outputs generated at the output of demodulator 57. One advantage of having circuit 29 operate continuously is that it is easier to trouble-shoot in case of circuit malfunction. Of course, except when circuit 29 is operating on the timing acquisition equalizer outputs as just explained, any inhibit signal generated on lead 255 is meaningless. The function of gate 256 is to allow the signal on lead 255 to pass onto lead 26 only when timing acquisition is being performed. To this end, gate 256 is operated when a sampling phase adjustment is to be made. This is indicated by a signal on sampling phase adjust lead 25, which extends from receiver timing generator 27.

The above-described timing acquisition may require, for example, only five symbol intervals from the time that the first bit of $v_{I,m}$ appears on lead 31. It, will be recalled from the above expression for $Q_m$ and $Q_m$, however, that the generation of each equalizer output on lead 31 entails the multiplication in each of equalizer units 55 and 56 of 2M coefficients by an equal number of line samples. Thus, before any timing acquisition equalizer outputs can be formed at the output of demodulator 57, 2M samples of the received timing acquisition signal must be loaded into each equalizer unit. In the present illustrative embodiment, M=16. Thus there is a potential "equalizer loading" delay of at least thirty-two symbol intervals before the sampling phase correction can be made.

This delay is substantially reduced in accordance with the present invention, as can be understood from a consideration of the following:

The (distorted) signal received at the input to the receiver portion of modem 20 may be written as:

$$r(t) = \left\{ \sum_m a_m x(t - mT) - \sum_m \hat{a}_m y(t - mT) \right\} \cos(\omega_c t + \theta) \quad (1)$$
$$- \left\{ \sum_m a_m y(t - mT) - \sum_m \hat{a}_m x(t - mT) \right\} \sin(\omega_c t + \theta),$$

where $\omega_c$ is the carrier frequency, $\theta$ is the carrier phase, and $x(t)$ and $y(t)$ are the baseband-equivalent in-phase and quadrature-phase impulse responses. Additive Gaussian noise is omitted for simplicity. Let $$A(t) = \sum_m a_m x(t - mT) - \sum_m \hat{a}_m y(t - mT), \quad (2)$$

and $$B(t) = \sum_m a_m y(t - mT) - \sum_m \hat{a}_m x(t - mT).$$

Moreover, assume that the $a_m$'s and $\hat{a}_m$'s are periodic with period of NT. Then $$A(t) = A(t + NTd)$$

and $$B(t) = B(t + NTd) \quad (3)$$

$d = 1, 2 \ldots$

At any point in time $t_0 (= nT/2 + \tau, n = 0, 1, 2 \ldots$ in the present illustrative embodiment), the outputs of input circuitry 21 are $$r(t_0) = A(t_0) \cos(\omega_c t_0 + \theta) - B(t_0) \sin(\omega_c t_0 + \theta),$$

$$\hat{r}(t_0) = A(t_0) \sin(\omega_c t_0 + \theta) + B(t_0) \cos(\omega_c t_0 + \theta) \quad (4)$$

$d = 1, 2 \ldots$

Moreover, at $t = t_0 + NTd$, we have $$r(t_0 + NTd) = A(t_0 + NTd) \cos(\omega_c t_0 + \omega_c NTd + \theta) - B(t_0 + NTd) \sin(\omega_c t_0 + \omega_c NTd + \theta),$$

$$\hat{r}(t_0 + NTd) = A(t_0 + NTd) \sin(\omega_c t_0 + \omega_c NTd + \theta) + B(t_0 + NTd) \cos(\omega_c t_0 + \omega_c NTd + \theta) \quad (5)$$

$d = 1, 2 \ldots$

Substituting Eqs. (3) and (4) into Eq. (5) yields $$r(t_0 + NTd) = r(t_0) \cos(\omega_c NTd) - \hat{r}(t_0) \sin(\omega_c NTd),$$

$$\hat{r}(t_0 + NTd) = \hat{r}(t_0) \cos(\omega_c NTd) + r(t_0) \sin(\omega_c NTd) \quad (6)$$

$d = 1, 2 \ldots$

Since $\omega_c$ and NT are known quantities, so are $\cos(\omega_c NTd)$ and $\sin(\omega_c NTd)$. Thus, it is seen that the values of $r(t)$ and $\hat{r}(t)$ over all time can be determined once their values over an initial NT second interval are known.

Moreover, since a/d converter 23 operates at a rate of p/T samples per second, each NT second interval includes Np line samples. In accordance with the invention, then, the Hilbert transform component values at Np initial time points are determined by sampling $r(t)$ and $\hat{r}(t)$ for NT seconds. (In the present illustrative embodiment, Np=8.) The Hilbert transform component values at a sufficient number of "remaining" time points to load the equalizer are then determined in accordance with Eq. (6). That is, the Hilbert transform component values at each "initial" time point are used to determine the component values NTd seconds later at associated time points ($t_0 + NTd$).

In preferred embodiments of the invention, $\omega_c$, N and T are chosen such that the $\omega_c NT = 2\pi n$, where n is any integer. In that case, $\cos(\omega_c NTd) = 1$ and $\sin(\omega_c NTd) = 0$, so that $$r(t_0 + NTd) = r(t_0)$$

$$\hat{r}(t_0 + NTd) = \hat{r}(t_0) \quad (7)$$

$d = 1, 2 \ldots$

That is, the value of each Hilbert transform component at each "initial" time point is simply replicated in order to arrive at the value of the corresponding component at respective ones of the "remaining" time points.

In the present illustrative embodiment, in particular $\omega_c = 2\pi \cdot 1800$, and $T = 1/2400$ and, since the double dotting pattern repeats after four symbol intervals, N=4. Thus, $\omega_c NT = 6\pi$, and the line sample components can be replicated in accordance with Eq. (7). The latter may be rewritten in terms of the sample index m as $$r_m = r_{m-4d}$$

$$\hat{r}_m = \hat{r}_{m-4d}$$

$$r'_m = r'_{m-4d}$$

$$\hat{r}'_m = \hat{r}'_{m-4d} \quad (8)$$

d = 1, 2 . . .

Figure 7:
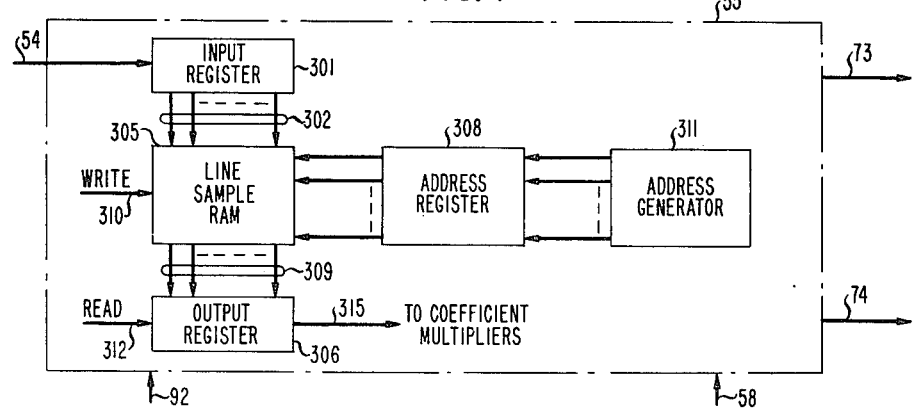
FIG. 7 is a block diagram of an equalizer unit used in the receiver of FIG. 2, the equalizer unit including circuitry for carrying out the present invention.

The manner in which line sample values are replicated, or otherwise determined, in accordance with the invention will vary with the circuit arrangement used to store the line samples. FIG. 7 shows one possible line sample storage arrangement for use in equalizer unit 55. (A similar arrangement would be used in equalizer unit 56.)

At the heart of the line sample storage arrangement is line sample random access memory (RAM) 305. RAM 305 has K storage locations each associated with a different binary address from 0 to (K−1). The arrangement of FIG. 7 also includes input and output registers 301 and 306, respectively, address register 308 and address generator 311. Line sample components from lead 54 are loaded into successive storage locations in RAM 305, real component first. When line sample component $r_m$ for example, is to be read into RAM 305, that component is shifted in serial form from lead 54 into register 301. At the same time, address generator 311 loads an address into register 308. A subsequent write pulse on lead 310 causes $r_m$ to pass in parallel form via leads 302 into the location in RAM 305 identified by the address in register 308. Line sample component $\hat{r}_m$ is thereafter loaded into the next location within RAM 305 in a similar manner.

RAM 305 always provides in parallel form on leads 309 the contents of the storage location identified by the current address in register 308. To read out a desired line sample component, then, address generator 311 loads the appropriate address into register 308 and read lead 312 is pulsed. This causes the data on leads 309 to be loaded into output register 306 whence they are shifted out onto lead 315 for processing, e.g., coefficient multiplication.

Once a line sample component is stored at a particular address in RAM 305 it remains at that location until it is sufficiently "old" that it is no longer needed. With such an approach, generation of addresses in address generator 311 may be advantageously carried out by storing within generator 311 a data word referred to as a "pointer" or "virtual origin". At any point in time, the value of the pointer is equal to the address within RAM 305 of the last line sample component which was stored. The address in which a newly-received sample component is to be stored is then generated by incrementing the pointer by unity.

Generating the address of the location in which the $i^{th}$ previous real or imaginary line sample component was stored (in order to read that component into register 306, for example) is accomplished by subtracting $(2i+1)$ from the pointer to retrieve the real component or subtracting $(2i)$ to retrieve the imaginary component.

In order to replicate every eighth line sample of the received timing acquisition signal in accordance with the invention, the real component of the first line sample thereof is read into RAM 305 in the manner described above. A succession of addresses is then generated by adding multiples of eight to the pointer. As each address is loaded into register 308, write lead 310 is strobed, causing the line sample component value in register 301 to be replicated in the appropriate locations in RAM 305. The imaginary component of the same line sample component is then loaded into register 301, the pointer within address generator 311 is set to the appropriate value, and the process is repeated. The real and imaginary components of the timing acquisition signal samples formed during the next seven symbol intervals are replicated within RAM 305 in a similar manner.

Although not explicitly stated above, it should be understood that whenever adding or subtracting a number from the pointer results in an address outside of the range 0 to (K−1), the number K is to be added to or subtracted from that address so as to bring the address within the 0 to (K−1) range. This happens automatically if K is a power of 2.

Figure 8:
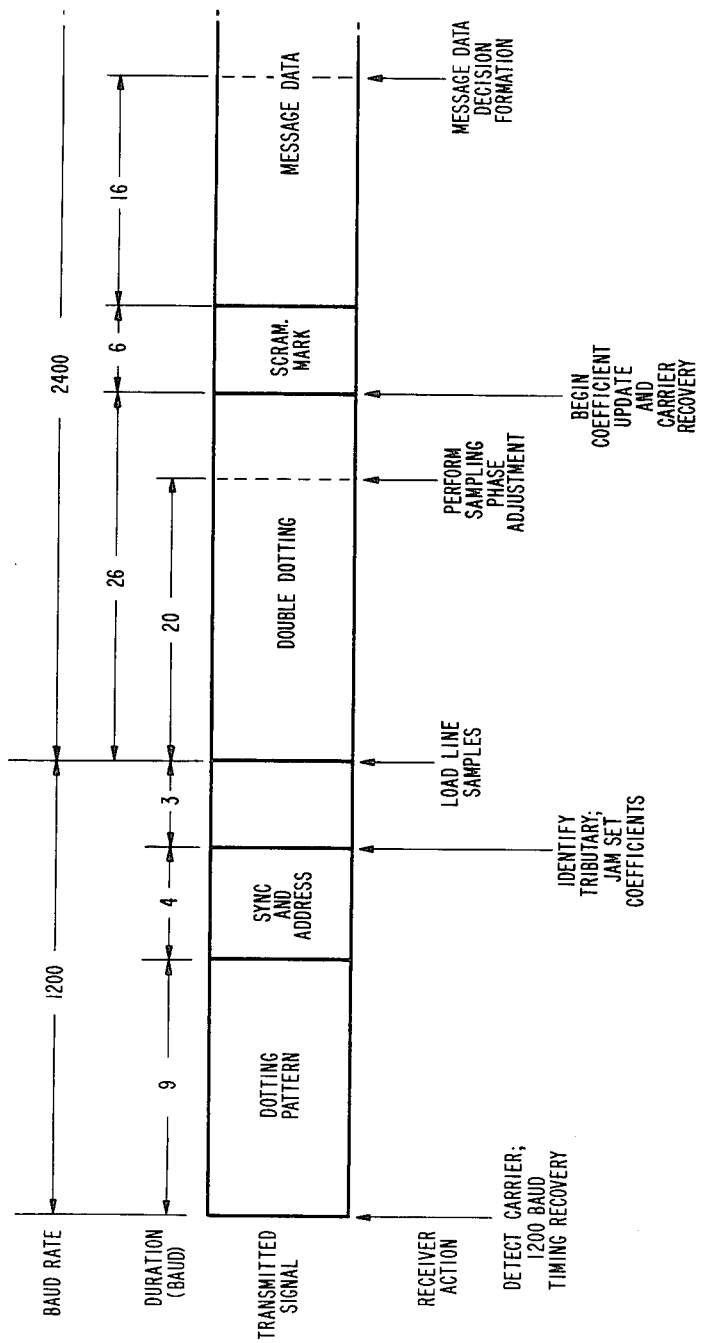
FIG. 8 is a timing diagram showing an illustrative overall start-up sequence for the transmission of data from a tributary modem to the master modem in the communication system of FIG. 1.

An illustrative overall start-up sequence for transmission from one of tributary modems 11a, 11b, . . . 11n to master modem 20 is depicted in FIG. 8. The tributary modem begins transmitting at the rate of 1200 baud. The transmission at this rate, more particularly begins with ten symbol intervals of dotting pattern (+1, −1, +1, −1 etc.). The dotting pattern serves two functions. First, it informs the master modem that a transmission is beginning (the so-called carrier detect function). The dotting pattern is also used to determine an appropriate timing epoch for recovering the information contained in the next ten symbol intervals. The latter information, in particular, is comprised of six symbol intervals of synchronization and address information, the latter identifying the address of the tributary modem which is transmitting. A 1200 baud rate is sufficiently slow that the synchronization and address information can be accurately recovered by the master modem without equalization. As previously described, the address of the tributary modem is provided on lead 94 (FIG. 2), and store 91 responds by jam setting a previously-determined set of coefficients for the channel in question into equalizer units 55 and 56.

After a short delay of perhaps three symbol intervals, during which the transmitter in the tributary modem changes its transmission mode, the tributary modem begins transmitting double dotting pattern at the 2400 baud rate. As the samples of the double dotting pattern are formed, they are replicated in accordance with the invention and stored in equalizer units 55 and 56. In addition to the four symbol intervals necessary to store the line samples, the receiver requires a number of additional symbol intervals to perform the above-described demodulation and other signal processing required to generate baseband equalizer outputs at the output of demodulator 57 and to permit transients to die out. After twenty symbol intervals of received double dotting, in particular, the duration of the inhibit signal on lead 255 (FIG. 6) is assured to be an accurate measure of the timing error. At this time, then, lead 25 (FIGS. 2 and 6) is activated, causing the above-described advance or retard of the sampling phase, i.e., of the operation of receiver timing generator 27. Double dotting continues for four more symbol intervals, allowing equalizer units 55 and 56 to be filled with line samples taken with the new, correct timing epoch. The inhibit on carrier source 81 is released at this time, allowing it to begin to make its estimate, $\theta^*_m$, of the demodulation carrier phase. The fact that the estimate of $\theta^*_m$ is made with line samples taken with the correct timing epoch allows that estimate to be made rapidly. The inhibit on the coefficient update circuitry is also released at this time, allowing the coefficients to fine tune from their jam set values. This is followed by six symbol intervals of scrambled "mark" to allow the scramblers in the transmitter and receiver to synchronize with each other. The overall turn-around time is thus sixteen symbol intervals at 1200 baud and thirty-two symbol intervals at 2400 baud for a total of 26.7 ms.

The message data is now transmitted. After sixteen symbol intervals of message data, corresponding to the time that the initial samples thereof have reached the center of the equalizer units, decisions as to the values of the transmitted symbols begin to appear on lead 86 (FIG. 2).

The foregoing merely illustrates the principles of the present invention. Those skilled in the art will be able to devise various arrangements embodying the principles of the invention without departing from the spirit and scope of our inventive teachings.

I claim:

1. A method for use in a receiver adapted to receive a modulated signal, said method comprising the steps of
   (a) determining the value of said modulated signal at a predetermined number of time points spaced T/p seconds apart, this step including the step of determining the value of said modulated signal at Np initial ones of said time points by sampling said modulated signal at p/T samples per second, and
   (b) multiplying the value of said modulated signal at each of said predetermined number of time points by a respective coefficient and recovering the baseband component of said modulated signal in response to the sum of the resulting products,
characterized in that when said baseband component is a periodic signal of period NT seconds, step (a) includes the further step of
   (c) determining the value of said modulated signal at each remaining one of said predetermined number of time points as a function of the value thereof at a respective one of said initial time points.

2. The invention of claim 1 wherein in step (c) the value of said modulated signal at each of said initial time points determines the value of said signal NTd seconds later, $d = 1, 2 \ldots$.

3. The invention of claims 1 or 2 wherein said modulated signal has a radian carrier frequency $\omega_c$, wherein $\omega_c NT = 2\pi n$, n being any integer, and wherein step (c) is comprised of the step of replicating the determined value of said modulated signal at each of said initial ones of said time points.

4. A method for determining the Hilbert transform component values r(t) and r̂(t) of a received complex data signal at a plurality of time points spaced T/p seconds apart, the frequency spectrum of said signal being comprised of at least a first plurality of spectral lines spaced $2\pi/NT$ radians/second apart, said method comprising the steps of
   determining the Hilbert transform component values of said signal at Np initial ones of said time points, and
   determining the Hilbert transform component values of said signal at each remaining one of said plurality of time points as a function of the values thereof at a respective associated one of said initial time points.

5. The invention of claim 4 wherein said signal is a modulated data signal of radian carrier frequency $\omega_c$ and wherein in the second of said determining steps, said function is $$r(t_0 + NTd) = r(t_0) \cos (\omega_c NTd) - \hat{r}(t_0) \sin (\omega_c NTd)$$

$$\hat{r}(t_0 + NTd) = \hat{r}(t_0) \cos (\omega_c NTd) + r(t_0) \sin (\omega_c NTd),$$

$n = 1, 2 \ldots,$
where $t_0$ is said one of said initial time points and $(t_0 + NTd)$ are the ones of said remaining time points with which said one of said initial time points is associated.

6. The invention of claim 5 wherein $\omega_c NT = 2\pi n$, n being any integer, whereby $$r(t_0 + NTd) = r(t_0)$$

$$\hat{r}(t_0 + NTd) = \hat{r}(t_0),$$

$d = 1, 2 \ldots$.

7. The invention of claims 4, 5 or 6 wherein said signal is a quadrature amplitude modulated data signal having periodic baseband signal of period NT seconds modulated onto at least a selected one of its in-phase and quadrature-phase carriers.

8. The invention of claim 4 wherein said signal is a modulated data signal having radian carrier frequency $\omega_c$, wherein $\omega_c NT = 2\pi n$, n being any integer, and wherein the second of said determining steps is comprised of the step of replicating the component values determined in the first of said determining steps.

9. A receiver adapted to receive a modulated signal, said receiver including
   first means for determining the value of said modulated signal at a predetermined number of time points spaced T/p seconds apart, said first means including sampling means (21, 23, 27, 28) for determining the value of said modulated signal at Np initial ones of said time points by sampling said modulated signal at p/T samples per second, and
   means (53, 55, 56, 57, 64, 65, 67, 71, 81) for multiplying the value of said modulated signal at each of said predetermined number of time points by a respective coefficient and for recovering the baseband component of said modulated signal in response to the sum of the resulting products,
   characterized in that said first means includes second means (301, 305, 308, 311) operative when said baseband component is a periodic signal of period NT seconds for determining the value of said modulated signal at each remaining one of said predetermined number of time points as a function of the value of said modulated signal at a respective one of said initial time points.

10. The invention of claim 9 wherein said second means includes means for utilizing the value of said modulated signal at each of said initial time points to determine the value of said modulated signal NTd seconds later, $d = 1, 2 \ldots$ 11. The invention of claim 10 wherein said modulated signal has a radian carrier frequency $\omega_c$, wherein $\omega_c NT = 2\pi n$, n being any integer, and wherein said utilizing means is comprised of means for replicating each value determined by said first means.

12. Apparatus for determining the Hilbert transform component values r(t) and r̂(t) of a received complex data signal at a plurality of time points spaced T/p seconds apart, the frequency spectrum of said signal being comprised of at least a first plurality of spectral lines spaced $2\pi/NT$ radians/second apart, said apparatus comprising
   first means (21, 23, 27, 28) for determining the Hilbert transform component values of said signal at Np initial ones of said time points, and
   second means (301, 305, 308, 311) for determining the Hilbert transform component values of said signal at each remaining one of said plurality of time points as a function of the values thereof at a respective associated one of said initial time points.

13. The invention of claim 12 wherein said signal is a modulated data signal of radian carrier frequency $\omega_c$ and wherein said function is $$r(t_0+NTd) = r(t_0) \cos(\omega_c NTd) - \hat{r}(t_0) \sin(\omega_c NTd)$$

$$\hat{r}(t_0 NTd) = \hat{r}(t_0) \cos(\omega_c NTd) + r(t_0) \sin(\omega_c NTd),$$

$d = 1, 2 \ldots,$ where $t_0$ is said one of said initial time points and $(t_0+NT)$ are the ones of said remaining time points with which said one of said initial time points is associated.

14. The invention of claim 13 wherein $\omega_c NT = 2\pi n$, n being any integer, whereby $$r(t_0+NTd) = r(t_0)$$

$$\hat{r}(t_0+NTd) = \hat{r}(t_0),$$

$d = 1, 2 \ldots$

15. The invention of claims 12, 13 or 14 wherein said signal is a quadrature amplitude modulated data signal having a periodic baseband signal of period NT seconds modulated onto at least a selected one of its in-phase and quadrature-phase carriers.

16. The invention of claim 12 wherein said signal is a modulated data signal having radian carrier frequency $\omega_c$, wherein $\omega_c NT = 2\pi n$, n being any integer, and wherein said second means is comprised of means for replicating the component values determined by said first means.

* * * * *